US010361596B1

(12) United States Patent
Al-Habob et al.

(10) Patent No.: US 10,361,596 B1
(45) Date of Patent: Jul. 23, 2019

(54) PROTOCOL, METHOD AND SYSTEM FOR SIMULTANEOUS WIRELESS INFORMATION AND POWER TRANSFER RELAYING NETWORK

(71) Applicant: King Fahd University of Petroleum and Minerals, Dhahran (SA)

(72) Inventors: Ahmed A. Al-Habob, Dhahran (SA); Anas M. Salhab, Dhahran (SA); Salam A. Zummo, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/116,344

(22) Filed: Aug. 29, 2018

(51) Int. Cl.
*H02J 50/80* (2016.01)
*H02J 50/20* (2016.01)
*H04B 5/00* (2006.01)

(52) U.S. Cl.
CPC ............. *H02J 50/80* (2016.02); *H02J 50/20* (2016.02); *H04B 5/0037* (2013.01)

(58) Field of Classification Search
CPC ............ H02J 50/20; H02J 50/80; H02J 50/40
See application file for complete search history.

(56) References Cited

U.S. PATENT DOCUMENTS

2017/0310380 A1\* 10/2017 Kim ...................... H04B 7/155
2018/0343104 A1\* 11/2018 Gurbuz .................... H04L 5/14

FOREIGN PATENT DOCUMENTS

| CN | 107277925 A | 10/2017 |
| FR | 3 049 793 | 10/2017 |

OTHER PUBLICATIONS

Yuan Liu, "Wireless Information and Power Transfer for Multi-Relay Assisted Cooperative Communication", IEEE Communications Letters, vol. 20, No. 4, Apr. 2016, pp. 1-4.
Ali A. Nasir, et al., "Throughput and Ergodic Capacity of Wireless Energy Harvesting Based DF Relaying Network", IEEE ICC 2014—Selected Areas in Communications Symposium, 2014, pp. 4066-4071.
Ali A. Nasir, et al., "Relaying Protocols for Wireless Energy Harvesting and Information Processing", IEEE Transactions on Wireless Communications, vol. 12, No. 7, Jul. 2013, pp. 3622-3636.
Saman Atapattu, et al., "Optimal Energy Harvesting Protocols for Wireless Relay Networks", IEEE Transactions on Wireless Communications, vol. 15, No. 8, Aug. 2016, pp. 5789-5803.

\* cited by examiner

*Primary Examiner* — Kamran Afshar
*Assistant Examiner* — Farideh Madani
(74) *Attorney, Agent, or Firm* — Oblon, McClelland, Maier & Neustadt, L.L.P.

(57) ABSTRACT

A simultaneous wireless information and power transfer relaying network system includes a source, a relay and a destination node. An overall time slot constituting a relaying protocol of the system includes a first time slot assigned for the source and a second time slot assigned for the relay, where at least a part of the first time slot is assigned for an information transmission from the source to the relay. A time duration of the second time slot is greater than a time duration of the at least part of the first time slot assigned for the information transmission from the source to the relay. A method of communication for the SWIPT relaying network system includes determining a structure of the overall time slot including ratios of time durations of subparts of the overall time slot.

15 Claims, 14 Drawing Sheets

PROTOCOL, METHOD AND SYSTEM FOR SIMULTANEOUS WIRELESS INFORMATION AND POWER TRANSFER RELAYING NETWORK

BACKGROUND

Technical Field

The present disclosure relates to relayed wireless networks, particularly directed to the simultaneous wireless information and power transmission (SWIPT) relaying technology.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Wireless power transfer (WPT) has received significant attention, as a promising solution to prolong the lifetime of power-constrained wireless nodes. WPT enables power-constrained wireless nodes to obtain ("harvest") energy from a radio frequency (RF) signal impinging on receiving antennas of the nodes. Simultaneous wireless information and power transmission (SWIPT) over a same RF band was described in L. R. Varshney, "Transporting information and energy simultaneously," *Proc. IEEE Int. Symp. Inf. Theory, Toronto, ON, Canada*, July 2008, pp. 1612-1616, the entire contents of which are incorporated herein by reference. In the early studies, the receiver was assumed to be able to decode information and harvest energy from a same RF signal independently, as described also in P. Grover and A. Sahai, "Shannon meets tesla: Wireless information and power transfer," *Proc. IEEE Int. Symp. Inf. Theory, Austin, Tex., USA*, June 2010, pp. 2363-2367, the entire contents of which are incorporated herein by reference.

Practical receiver architectures including the power-splitting (PS) receiver and the time-switching (TS) receiver for SWIPT were described in R. Zhang and C. K. Ho, "MIMO broadcasting for simultaneous wireless information and power transfer," *IEEE Trans. Wireless Commun.*, vol. 12, no. 5, pp. 1989-2001, May 2013, the entire contents of which are incorporated herein by reference. In the PS receiver, the power of the RF signal received is split into two portions, where one portion is fed to an information decoder (ID) and the other one is fed to an energy harvester (EH). In the TS receiver, the RF signal received is fed to either the ID or the EH at any time instant. In designing a point-to-point (P2P) SWIPT system, the PS receiver architecture was reported to achieve always larger rate-energy pairs than the TS receiver architecture, as described in X. Zhou, R. Zhang, and C. K. Ho, "Wireless information and power transfer: Architecture design and rate-energy tradeoff," *IEEE Trans. Commun.*, vol. 61, no. 11, pp. 4754-4767, November 2013, the entire contents of which are incorporated herein by reference.

A relayed "dual-hop" wireless network with an energy constrained amplify-and-forward (AF) relay that assists communication between a source node and a destination node was reported by A. A. Nasir, X. Zhou, S. Durrani, and R. A. Kennedy, "Relaying protocols for wireless energy harvesting and information processing," *IEEE Trans. Wireless Commun.*, vol. 12, no. 7, pp. 3622-3636, July 2013, the entire contents of which are incorporated herein by reference. In the article, the authors proposed a power-splitting relaying (PSR) protocol and a time-switching relaying (TSR) protocol, concluded that the TSR protocol outperforms the PSR protocol in terms of throughput at high transmission rates and relatively low signal-to-noise ratio (SNR). On the other hand, a decode-and-forward (DF) relaying network was also studied and analytical expressions for the ergodic capacity were derived for both the PSR and TSR protocols as described in "Throughput and ergodic capacity of wireless energy harvesting based DF relaying network," *Proc. IEEE Int. Conf. Commun. (ICC), Sydney, Australia*, June 2014, pp. 4066-4071, the entire contents of which are incorporated herein by reference. The authors disclosed that the PSR protocol outperforms the TSR protocol in terms of throughput for a wide range of SNR. The PSR and the TSR protocols for "dual-hop" relaying network with DF relay equipped with a rechargeable battery were also studied as described in M. Ju, K. M. Kang, K. S. Hwang, and C. Jeong, "Maximum transmission rate of PSR/TSR protocols in wireless energy harvesting DF-based relay networks," *IEEE J. Sel. Areas in Commun.*, vol. 33, no. 12, pp. 2701-2717, December 2015, the entire contents of which are incorporated herein by reference. A hybrid protocol that combines the TSR and the PSR protocols for relaying networks was proposed as described in S. Atapattu and J. Evans, "Optimal energy harvesting protocols for wireless relay networks," *IEEE Trans. Wireless Commun.*, vol. 15, no. 8, pp. 5789-5803, August 2016, the entire contents of which are incorporated herein by reference.

Opportunistic user scheduling technique for the multi-destination relay network achieves a maximum overall system capacity by selecting the destination of the best channel (relay to destination) to receive the source message among the destinations, as reported, for example, by N. Yang, M. Elkashlan, and J. Yuan, "Impact of opportunistic scheduling on cooperative dual-hop relay networks," *IEEE Trans. on Commun.*, vol. 59, no. 3, pp. 689-694, March 2011, and by K. T. Hemachandra and N. C. Beaulieu, "Outage analysis of opportunistic scheduling in dual-hop multiuser relay networks in the presence of interference," *IEEE Trans. on Commun.*, vol. 61, no. 5, pp. 1786-1796, May 2013, the entire contents of them are incorporated herein by reference.

Conventional TSR and PSR protocols suffer from outage performance which impacts network reliability. In order to address the drawbacks of outage performance it is one object of the present disclosure to provide a relaying protocol for a simultaneous wireless information that improves network reliability, power transfer, time-switching, and power-splitting.

SUMMARY

In an exemplary implementation, a simultaneous wireless information and power transfer (SWIPT) relaying network system includes a source, a relay configured to receive the wireless signal, harvest an energy from the wireless signal, regenerate and transmit a relayed wireless signal, and a destination node. The destination node is selected as a best channel from a plurality of destination nodes which all located out of a transmission range of the source but capable of receiving the relayed wireless signal from the relay. An overall time slot constituting a relaying protocol of the SWIPT relaying network includes a first time slot assigned for a transmission of the wireless signal from the source to the relay, where at least a part of the first time slot is assigned for an information transmission from the source to the relay, and a second time slot following the first time slot and assigned for a transmission of the relayed wireless signal from the relay to the destination node. A time duration of the second time slot is greater than a time duration of the at least part of the first time slot assigned for the information transmission from the source to the relay.

In another exemplary embodiment, a communication method for the SWIPT relaying network system includes transmitting a wireless signal by a source node, receiving the wireless signal by a relay node, harvesting energy from the wireless signal by the relay node, decoding the wireless signal, and regenerating and transmitting a relayed wireless signal by the relay node, and receiving the relayed wireless signal from the relay by a destination node. An overall time slot constituting a relaying protocol of the SWIPT relaying network system is defined similar way to described in the exemplary implementation above, where the communication method may further include determining a structure of the overall time slot including ratios of time durations of subparts of the overall time slot.

The foregoing general description of the illustrative embodiments and the following detailed description thereof are merely exemplary aspects of the teachings of the present disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
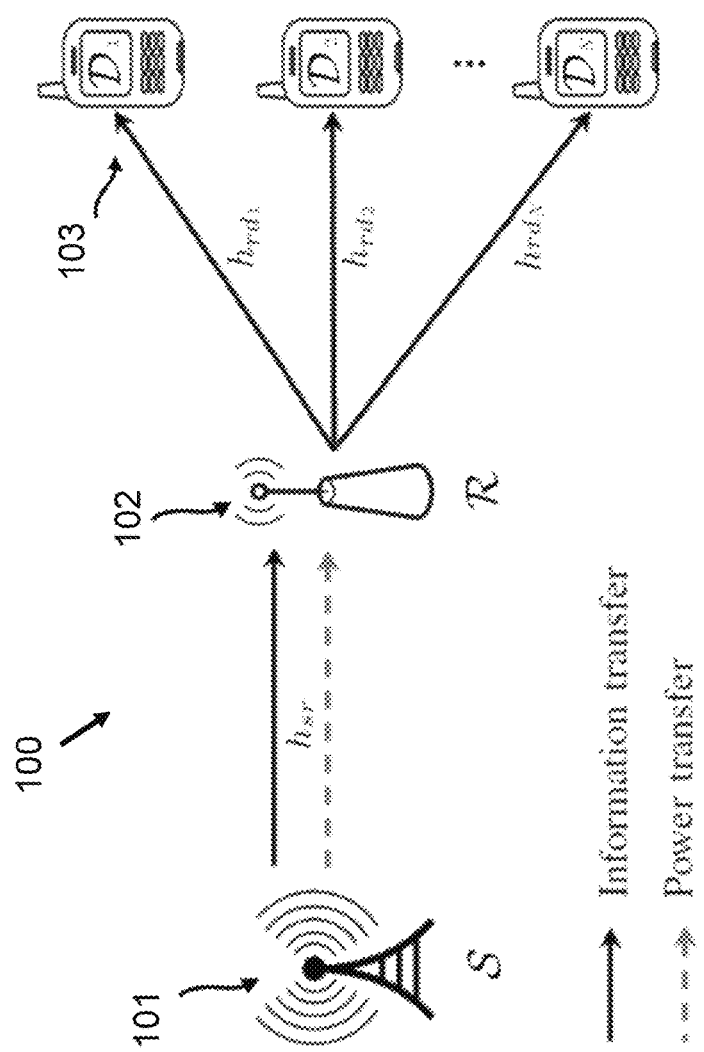
FIG. 1 is a schematic diagram of a SWIPT relaying network system with multiple destinations, according to certain embodiments of the present disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to protocol for wireless network, relayed wireless network, and method for designing wireless network.

FIG. 1 is a schematic diagram of a system for a simultaneous wireless information and power transmission (SWIPT) relaying network 100, comprising a source 101, a relay 102 and a set of N destinations $D_n$ (n=1, 2, . . . , N) 103, according to certain embodiments of the present disclosure. The relay 102 is assumed to be a decode-and-forward (DF) relay and not equipped with a power source, unless otherwise specified. Opportunistic scheduling is used to select a destination from among the multiple destinations $D_n$ (n=1, 2, . . . , N) 103, where the destination of the best channel (relay to destination) is selected to receive the source message. Each node is assumed to have a single antenna. Also, all the destinations $D_n$ (n=1, 2, . . . , N) 103 are assumed to be out of the transmission range of the source 101, and no direct link exists between the source 101 and any of these destinations $D_n$ (n=1, 2, . . . , N) 103.

All links are subject to independent and flat Rayleigh fading with the channel-state-information (CSI) of all links known at the source and relay. Let $h_{sr}$ and $h_{rd_n}$ denote the Rayleigh fading coefficients of the channel links S→R and R→$D_n$, respectively. The corresponding channel power gains $\varphi_{ab}=|h_{ab}|^2$ will be following exponential distribution with parameter $\lambda_{ab}=d_{ab}^\varepsilon$, where the subscript a stands for either s (the source) or r (the relay), the subscript b for either r or d (the destination), and d is the distance between a and b, and $\varepsilon$ denotes the path loss exponent. The destinations $D_n$ (n=1, 2, . . . , N) 103 are assumed located in close proximity to each other with $\lambda_{rd_n}=\lambda_{rd}$. The relay 102 communicates with a selected destination, such that $\varphi_{rd}^*=\max\{\varphi_{rd_n}\}$, n=1, 2, . . . , N. At the information decoder, the RF band signal is demodulated to a baseband signal, with an additive white Gaussian noise (AWGN) term of w~N (0, 1). All power levels discussed below in the present disclosure are preferably normalized by the noise power level of the receivers which is assumed to be the same between the relay and the destinations. All above described features of the SWIPT relay network 100 may be found in some conventional approaches discussed herein for comparison purpose, unless otherwise specified.

Figure 2:
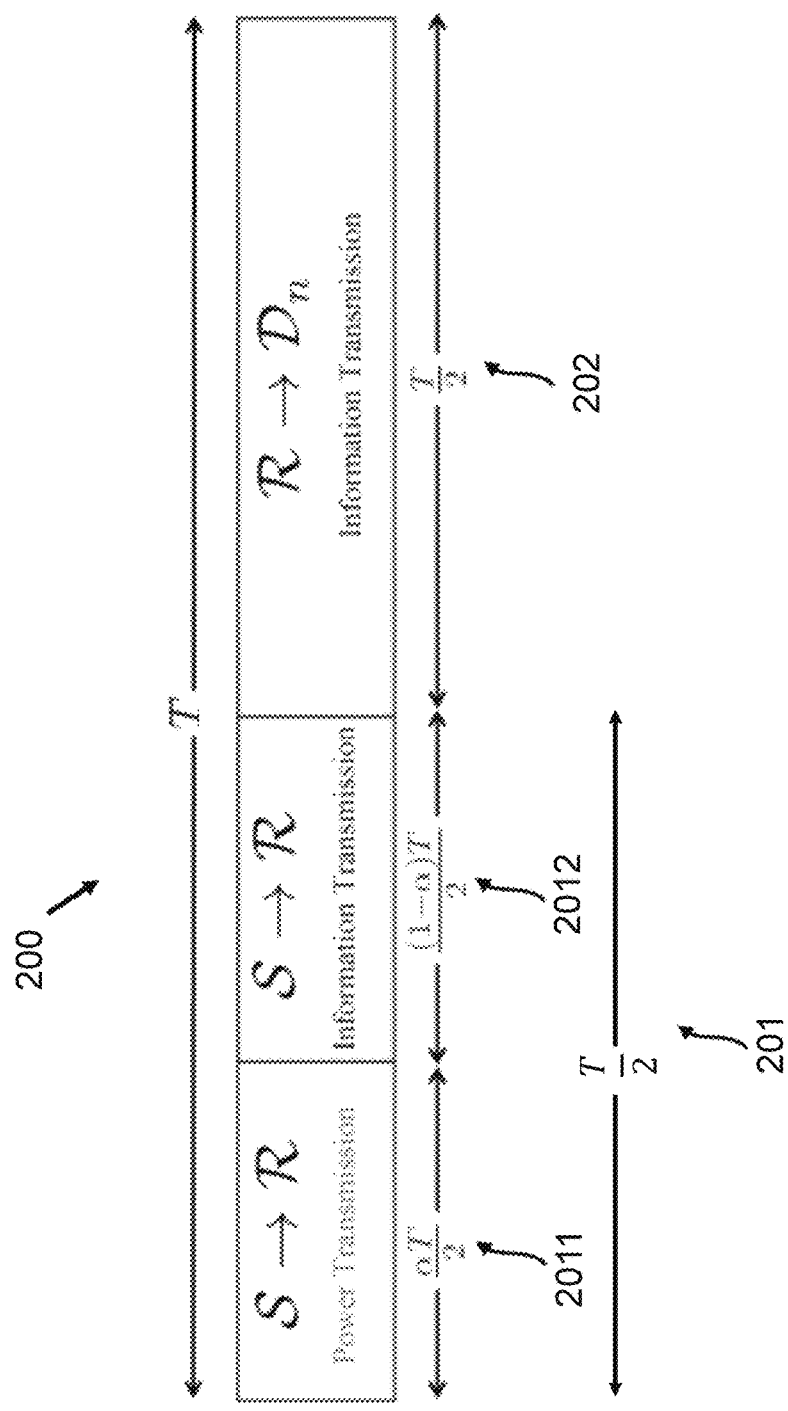
FIG. 2 is an exemplary schematic diagram of a time slot of time-switching relaying (P-TSR) protocol for the SWIPT relaying network according to certain embodiments of the present disclosure.

FIG. 2 is an exemplary diagram of a time slot 200 according to certain embodiments of the present disclosure for the time-switching relaying ("P-TSR") protocol for the SWIPT relaying network. In FIG. 2 the time slot 200 is divided equally between the source (the first time slot 201) and the relay (the second time slot 202) for each to transmit the RF signal with a time duration of T/2 as illustrated in FIG. 2. In phase I 2011 of the first time slot 201, the relay R harvests energy from the RF signal from the source S for a time duration of $$\alpha \frac{T}{2}.$$

The harvested energy at the relay R can be expressed as $$E_r^{PTSR} = \zeta \alpha P_s \varphi_{sr} \frac{T}{2}, \quad (1)$$

where $P_s$ is the maximum attainable power of the source, $\varphi_{sr}$, the channel power gain between the source and the relay, and $0<\zeta\leq1$, the energy harvesting efficiency. In phase II 2012 of the first time slot 201, the source S communicates with the relay R over a time duration of $$(1-\alpha)\frac{T}{2}.$$

Based on Shannon theorem, a receiver can successfully decode the message with a targeted data rate $R_d$ if $$R_d \leq \tau \log_2(1+SNR), \text{ or } SNR \geq 2^{\frac{R_d}{\tau}}-1. \quad (2)$$

where, $\tau$ is the time allocated for the RF signal transmission from a source to the receiver and SNR is the signal-to-noise ratio at the receiver. Taking into account that SNR at the relay R is given by $P_s\varphi_{sr}$, the information decoder at the relay R can successfully decode the source message with a targeted data rate $R_d$ if $$R_d \leq \frac{1-\alpha}{2}\log_2(1+P_s\varphi_{sr}), \text{ or } P_s\varphi_{sr} \geq 2^{\frac{2R_d}{1-\alpha}}-1 = \gamma_1^{PTSR}, \quad (3)$$

where, $\gamma_1^{PTSR}$ is the SNR outage threshold at the relay R of the P-TSR protocol. The SNR outage threshold is a minimum SNR required for the receiver to successfully decode the RF signal.

In the second time slot 202, the relay R communicates with a selected destination D, over a time duration of T/2 with a transmission power given by $$P_r^{PTSR} = \frac{E_r^{PTSR}}{T/2} = \zeta\alpha P_s\varphi_{sr}. \quad (4)$$

The destination $D_i$ can successfully decode the relay message with a targeted data rate $R_d$ if $$R_d \leq \frac{1}{2}\log_2(1+P_r^{PTSR}\varphi_{rd}^*), \text{ or } P_r^{PTSR}\varphi_{rd}^* \geq 2^{2R_d}-1 = \gamma_2^{PTSR}, \quad (5)$$

where $\gamma_2^{PTSR}$ is the SNR outage threshold at the selected destination $D_i$ of the P-TSR protocol.

Figure 3:
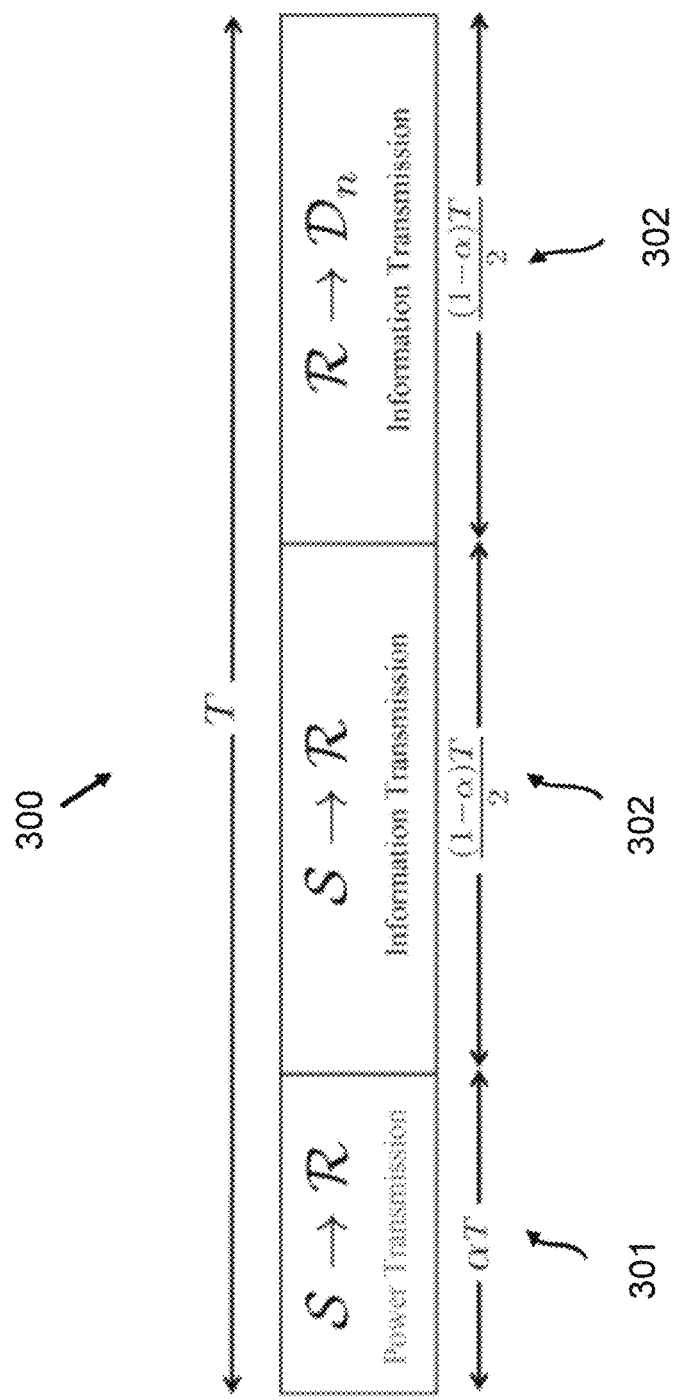
FIG. 3 is a schematic diagram of a time slot of the conventional time-switching relaying (C-TSR) protocol for the SWIPT relaying network.

FIG. 3 illustrates a schematic diagram of a time slot T 300 of the conventional time-switching relaying ("C-TSR") protocol for the SWIPT relay network for comparison purpose. The C-TSR protocol is conducted over three phases as illustrated. In phase I 301, the relay R harvests energy from the source signal for a time duration of $\alpha T$, where $0<\alpha<1$. The harvested energy at the relay R can be expressed as $$E_r^{CTSR} = \zeta\alpha P_s\varphi_{sr}T. \quad (6)$$

In phase II 302, the source S communicates with the relay R over a time duration of $$(1-\alpha)\frac{T}{2}.$$

Based on Shannon theorem, and taking into account that SNR at the relay is given by $P_s\varphi_{sr}$, the relay can successfully decode the source message with a targeted data rate $R_d$ if $$R_d \leq \frac{1-\alpha}{2}\log_2(1+P_s\varphi_{sr}), \text{ or } P_s\varphi_{sr} \geq 2^{\frac{2R_d}{1-\alpha}}-1 = \gamma_1^{CTSR}, \quad (7)$$

where $\gamma_1^{CTSR}$ is the SNR outage threshold at the relay of the C-TSR protocol. In phase III 303, the relay communicates with a selected destination over the remaining time duration $$(1-\alpha)\frac{T}{2}$$

with a transmission power given by $$P_r^{CTSR} = \frac{E_r^{CTSR}}{(1-\alpha)T/2} = \frac{2\zeta\alpha}{1-a}P_s\varphi_{sr}. \quad (8)$$

Taking into account in Eq. (2) that SNR at the selected destination is given by $P_r^{CTSR}\varphi_{rd}^*$, the selected destination can successfully decode the relay message with a targeted data rate $R_d$ if $$R_d \leq \frac{1-\alpha}{2}\log_2(1 + P_r^{CTSR}\varphi_{rd}^*), \text{ or } P_r^{CTSR}\varphi_{rd}^* \geq 2^{\frac{2R_d}{1-\alpha}} - 1 = \gamma_2^{CTSR}, \quad (9)$$

where, $\gamma_2^{CTSR}$ is the SNR outage threshold at the selected destination of the C-TSR protocol.

Figure 4:
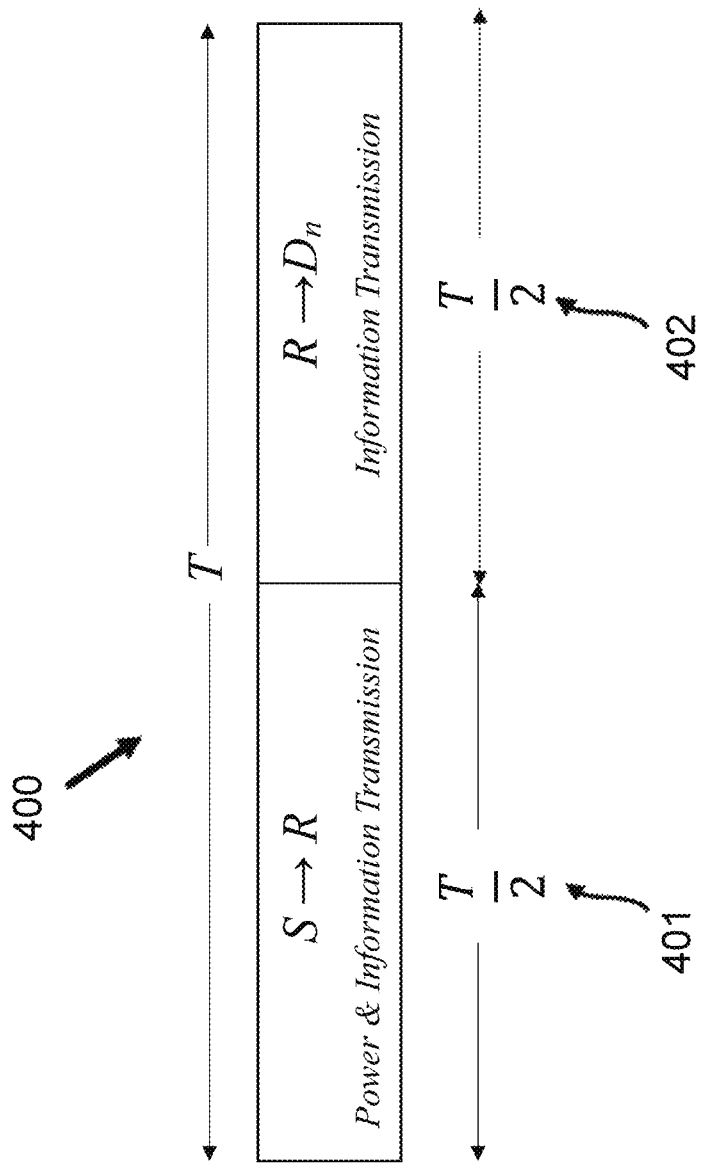
FIG. 4 is a schematic diagram of a time slot of the conventional power splitting relaying (PSR) protocol for the SWIPT relaying network.

Also for comparison purpose, FIG. 4 illustrates a schematic diagram of a time slot T 400 of the conventional power-splitting relaying ("PSR") protocol for the SWIPT relay network. The PSR protocol requires two time slots. In the first time slot 401, the source S communicates with the relay R over a time duration of T/2. A portion $\rho \in [0, 1]$ of the received power is fed to the information decoder of the relay R. Since SNR at the relay is given by $\rho P_s \varphi_{sr}$, the relay R can successfully decode the source message with a targeted data rate $R_d$ if $$R_d \leq \frac{1}{2}\log_2(1 + \rho P_s \varphi_{sr}), \text{ or } \rho P_s \varphi_{sr} \geq 2^{2R_d} - 1 = \gamma_1^{PSR}, \quad (10)$$

where $\gamma_1^{PSR}$ is the is the SNR outage threshold at the relay of the PSR protocol. The power splitting factor $\rho$ should achieve the constraint $$\rho P_s \varphi_{sr} \geq \gamma_1^{PSR}, P_s \varphi_{sr} \geq \gamma_1^{PSR}, (0 < \rho < 1). \quad (11)$$

An optimal value $\rho^*$ of $\rho$ that achieves the maximum harvested energy at the relay R is given, assuming all the residual power is used in the energy harvesting, as $$\rho^* = \frac{\gamma_1^{PSR}}{P_s \varphi_{sr}}, \quad (12)$$

and the maximum harvested energy is given by $$E_r^{PSR} = \zeta \frac{T}{2}[(1-\rho)P_s \varphi_{sr}]^+ = \zeta \frac{T}{2}(P_s \varphi_{sr} - \gamma_1^{PSR}), \quad (13)$$

where $[v]^+$ denotes $\max\{v, 0\}$. In the second time slot, the relay communicates with a selected destination over a time duration of T/2 with a transmission power given by $$P_r^{PSR} = \frac{E_r^{PSR}}{T/2} = \zeta(P_s \varphi_{sr} - \gamma_1^{PSR}). \quad (14)$$

Since SNR at the selected destination is given by $P_r^{PSR}\varphi_{rd}^*$, the destination can successfully decode the relay message with a targeted data rate $R_d$ if $$R_d \leq \frac{1}{2}\log_2(1 + P_r^{PSR}\varphi_{rd}^*), \text{ or } P_r^{PSR}\varphi_{rd}^* \geq 2^{2R_d} - 1 = \gamma_2^{PSR}, \quad (15)$$

where $\gamma_2^{PSR}$ is the SNR outage threshold at the selected destination.

Table I summarizes the SNR outage threshold (in dB) as a figure of merit for the first ($\gamma_1$) and the second ($\gamma_2$) hops for the three SWIPT relaying protocols, C-TSR, P-TSR and PSR. The SNR outage thresholds for the three protocols were calculated using above described equations for various normalized data rate $R_d$ and at the source power $P_s$=40 dB. From Table I, it is clear that the outage threshold of the second hop in the P-TSR is smaller than the outage threshold in the C-TSR for all data rates $R_d$. In SWIPT relay systems where the transmission power of the relay depends on the harvested energy from the source signal, both the harvested power at the relay and the outage threshold of the second hop have direct effect on the system performance. From this view point, Table I indicates that the P-TSR protocol has an advantage in reducing the outage threshold of the second hop, when compared with the C-TSR.

TABLE I

| | | R b/s/Hz | | | | | | |
|---|---|---|---|---|---|---|---|---|
| | | 0.5 | 1 | 1.5 | 2 | 2.5 | 3 | 3.5 |
| C-TSR | $\gamma_1$ | 5.3 | 9.4 | 12.9 | 16.2 | 19.2 | 22.3 | 25.4 |
| | $\gamma_2$ | 5.3 | 9.4 | 12.9 | 16.2. | 19.2 | 22.3 | 25.4 |
| P-TSR | $\gamma_1$ | 9.9 | 15.3 | 19.6 | 23.6 | 26.9 | 30.6 | 33.4 |
| | $\gamma_2$ | 0 | 4.8 | 8.5 | 11.8 | 14.9 | 17.9 | 21.0 |
| PSR | $\gamma_1$ | 0 | 4.8 | 8.5 | 11.8 | 14.9 | 17.9 | 21.0 |
| | $\gamma_2$ | 0 | 4.8 | 8.5 | 11.8 | 14.9 | 17.9 | 21.0 |

In order to further confirm the benefits of the P-TSR protocol under certain embodiments of the present disclosure, the inventors examined the outage probability characteristics of the three protocols for the SWIPT relay network by simulation as detailed below.

For above purpose, the inventors derived a unified expression for the outage probability $P_{out}$ of a SWIPT relaying network with a relay and multi-destinations operated with either of the C-TSR, P-TSR or PSR protocols, which is expressed as $$P_{out} = 1 + e^{-\delta_1 \frac{\lambda_{sr}\gamma_1}{P_s}} \sum_{i=1}^{N}\binom{N}{i}(-1)^i \left[\sqrt{\beta_i\gamma_2} K_1(\sqrt{\beta_i\gamma_2}) + \delta_2 \sum_{j=0}^{\infty} \frac{(-\lambda_{sr}\gamma_1)^{j+1} E_{j+2}\left(\frac{i\lambda_{rd}\gamma_2}{\psi\gamma_1}\right)}{j! P_s^{j+1}}\right], \quad (16)$$

where, $$\beta_i = \frac{4i \lambda_{rd}\lambda_{sr}}{\psi P_s}, E_n(x) = \int_1^{\infty} \tau^{-n}\exp(-x\tau) \, d\tau, K_1(\cdot)$$

is the modified Bessel function of the second kind and order one, and a) for P-TSR protocol, $$\psi = \zeta\alpha, \gamma_1 = 2^{\frac{2R_d}{1-\alpha}} - 1, \gamma_2 = 2^{2R} - 1, \delta_1 = 0,$$

and $\delta_2$=1, b) for C-TSR protocol, $$\psi = \frac{2\zeta\alpha}{1-\alpha}, \gamma_1 = \gamma_2 = 2^{\frac{2R_d}{1-\alpha}} - 1, \delta_1 = 0,$$

and $\delta_2$=1, c) for PSR protocol, $\psi = \zeta$, $\gamma_1 = \gamma_1 = \gamma_2 = 2^{2R_d} - 1$, $\delta_1$=1, and $\delta_2$=0.

Derivation of the unified expression Eq. (16) is described below. An outage event occurs in a SWIPT relay network with a source S, a relay R and multi-destinations $D_n$ if the channel capacity of the link S→R is lower than the target rate R or even when the channel capacity of the link S→R is higher than the target rate, if the links R→$D_n$ (n=1, . . . , N) is lower than the target rate R. Therefore, the end to end (S→D) outage probability of the considered system can be defined as $$P_{out} = Pr\{P_s\varphi_{sr} < \gamma_1\} + Pr\{P_s\varphi_{sr} < \gamma_1, P_r\varphi_{rd}^* < \gamma_2\}, \quad (17)$$

where, $P_r$ is the transmission power of the relay, $\gamma_1$ and $\gamma_2$ are the outage thresholds of the first and second hops, respectively.

From equations (4) and (8), $P_r = \psi P_s \varphi_{sr}$, where $\psi = \zeta\alpha$ for P-TSR, $$\psi = \frac{2\zeta\alpha}{1-\alpha}$$

for C-TSR. Consequently, the end to end outage probability in equation (17) can be expressed for P-TSR and C-TSR as $$P_{out}^{TS} = Pr\{P_s\varphi_{sr} < \gamma_1\} + Pr\{P_s\varphi_{sr} > \gamma_1, \psi P_s\varphi_{sr}\varphi_{rd}^* < \gamma_2\}. \quad (18)$$

Since $\varphi_{sr}$ and $\varphi_{rd}$ are exponentially distributed random variables with parameters $\lambda_{sr}$ and $\lambda_{rd}$, respectively, the outage probability in (18) is given by $$P_{out}^{TS} = 1 - \exp\left(\frac{-\lambda_{sr}}{P_s}\gamma_1\right) + \lambda_{sr}\int_{\frac{\gamma_1}{P_s}}^{\infty}\left[1 - \exp\left(-\frac{\lambda_{rd}\gamma_2}{\psi P_s v}\right)\right]^N e^{-\lambda_{sr}v}dv. \quad (19)$$

Here, the power N derives from the condition that all the N destinations are under outage events. Replacing $\tau = \varphi P_s v$ and using the binomial expansion $$(a+b)^N = \sum_{k=0}^{N}\binom{N}{k}a^{N-k}b^k,$$

we get $$P_{out}^{TS} = 1 + \sum_{i=1}^{N}\binom{N}{i}(-1)^i\left[\frac{\lambda_{sr}}{\psi P_s}\int_0^{\infty}\exp\left(-\frac{i\lambda_{rd}\gamma_2}{\tau} - \frac{\lambda_{sr}\tau}{\psi P_s}\right)d\tau - I_i\right], \quad (20)$$

where, $$I_i = \frac{\lambda_{sr}}{\psi P_s}\int_0^{\psi\gamma_1}\exp\left(-\frac{i\lambda_{rd}\gamma_2}{\tau} - \frac{\lambda_{sr}}{\psi P_s}\tau\right)d\tau. \quad (21)$$

Using the series expansion of the exponential function $$e^{-av} = \sum_{j=0}^{\infty}\frac{(-av)^j}{j!}$$

and the definition of $$E_n(x) = \int_1^{\infty}\tau^{-n}\exp(-x\tau)d\tau,$$

the integral $I_i$ can be written as $$I_i = \sum_{j=0}^{\infty}\frac{(-1)^j}{j!}\left(\frac{\lambda_{sr}}{\psi P_s}\right)^{j+1}\int_0^{\psi\gamma_1}\tau^j\exp\left(-\frac{i\lambda_{rd}\gamma_2}{\tau}\right)d\tau \quad (22)$$

$$= -\sum_{j=0}^{\infty}\frac{(-\lambda_{sr}\gamma_1)^{j+1}}{j!P_s^{j+1}}E_{j+2}\left(\frac{i\lambda_{rd}\gamma_2}{\psi\gamma_1}\right).$$

By substituting above $I_i$ in the equation (20) and using the definition of the modified Bessel function of the second kind and order one $$K_1(z) \equiv \frac{z}{4}\int_0^{\infty}\exp\left(-t - \frac{z^2}{4t}\right)t^{-2}dt = \frac{z}{4}\int_0^{\infty}\exp\left(-\frac{1}{x} - \frac{z^2}{4}x\right)dx, \quad (23)$$

we obtain the end to end outage probability of the system with the P-TSR and the C-TSR as $$P_{out}^{TS} = 1 + \sum_{i=1}^{N}\binom{N}{i} \quad (24)$$

$$(-1)^i\left[\sqrt{\beta_i\gamma_2}K_1(\sqrt{\beta_i\gamma_2}) + \sum_{j=0}^{\infty}\frac{(-\lambda_{sr}\gamma_1)^{j+1}E_{j+2}\left(\frac{i\lambda_{rd}\gamma_2}{\psi\gamma_1}\right)}{j!P_s^{j+1}}\right],$$

where $$\beta_i = \frac{4i\lambda_{rd}\lambda_{sr}}{\psi P_s},$$

$\psi = \zeta\alpha$ for P-TSR, $$\psi = \frac{2\zeta\alpha}{1-\alpha}$$

for C-TSR, and $$E_n(x) = \int_1^{\infty}\tau^{-n}\exp(-x\tau)d\tau.$$

For the PSR protocol, the transmission power of the relay can be written as $P_r = \psi[P_s\varphi_{sr} - \gamma_1]^+$, where $\psi = \zeta$. Consequently, the outage probability of equation (17) can be expressed as $$P_{out}^{PS} = Pr\{P_s\varphi_{sr} < \gamma_1\} + Pr\{P_s\varphi_{sr} > \gamma_1, \psi[P_s\varphi_{sr} - \gamma_1]\varphi_{rd}^* < \gamma_2\} \quad (25)$$

$$= 1 - e^{-\frac{\lambda_{sr}}{P_s}\gamma_1} + \lambda_{sr}\int_{\frac{\gamma_1}{P_s}}^{\infty}\left[1 - \exp\left(-\frac{\lambda_{rd}\gamma_2}{\psi[P_sv - \gamma_1]}\right)\right]^N e^{-\lambda_{sr}v}dv$$

$$= 1 - e^{-\frac{\lambda_{sr}}{P_s}\gamma_1} + \frac{\lambda_{sr}}{\psi P_s}e^{-\frac{\lambda_{sr}\gamma_1}{P_s}}\int_0^{\infty}\left[1 - \exp\left(-\frac{\lambda_{rd}\gamma_2}{\tau}\right)\right]^N e^{-\frac{\lambda_{sr}}{\psi P_s}\tau}d\tau.$$

Further using the binomial expansion and after the similar manipulations, we get $$P_{out}^{PS} = 1 + e^{\frac{-\lambda_{sr}}{P_s}\gamma_1} \sum_{i=1}^{N} \binom{N}{i}(-1)^i \sqrt{\beta_i\gamma_2}\, K_1(\sqrt{\beta_i\gamma_2}), \quad (26)$$

where $$\beta_i = \frac{4i\lambda_{rd}\lambda_{sr}}{\psi P_s}.$$

Using equations (24) and (26), the unified expression (16) of the end to end outage probability for the P-TSR, the C-TSR and the PSR is obtained.

Here we derive an expression for asymptotic outage probability at high SNR regime to get more insights about the system behavior. When we assume the source S has an unlimited transmission power (i.e., $P_s \to \infty$) in the equation (16) for the unified expression, following relation is obtained.

$$P_{out}^{\infty} \approx \left[\frac{\frac{\psi}{\lambda_{sr}}P_s}{\lambda_{rd}\gamma_2 I + \delta_2\psi\gamma_1 \sum_{i=1}^{N}\binom{N}{i}(-1)^{i+1} E_2\left(\frac{i\lambda_{rd}\gamma_2}{\psi\gamma_1}\right)}\right]^{-1}, \quad (27)$$

where, $$I = \int_0^\infty \left(1 - e^{-\frac{1}{\tau}}\right)^N d\tau,$$

$\psi$, $\gamma_1$, $\gamma_2$ and $\delta_2$ are defined in the unified expression (16). It is known that the outage probability can be written in the form at high SNR regime $$P_{out}^{\infty} \approx (G_c P_s)^{-G_d}, \quad (28)$$

where, $G_c$ and $G_d$ are the coding gain and diversity order of the system, respectively.

Comparing the equations (27) and (28), we have $G_d=1$ and $$G_c = \left[\frac{\frac{\psi}{\lambda_{sr}}}{\lambda_{rd}\gamma_2 I + \delta_2\psi\gamma_1 \sum_{i=1}^{N}\binom{N}{i}(-1)^{i+1} E_2\left(\frac{i\lambda_{rd}\gamma_2}{\psi\gamma_1}\right)}\right]. \quad (29)$$

Also for comparison purpose, we further derive here the outage probability of the conventional dual-hop multi-destination relaying network without SWIPT technique. The relay is equipped with an embedded power source and $$\tau = \frac{T}{2}$$

is assumed in the equation (2).

Then the end to end outage probability for the conventional dual-hop multi-destination relaying network is derived as $$P_{out} = Pr\{P_s\varphi_{sr} < \gamma\} + Pr\{P_s\varphi_{sr} > \gamma, P_r\varphi_{rd}^* < \gamma\} = \quad (30)$$

$$1 - e^{-\frac{\lambda_{sr}}{P_s}\gamma} + e^{-\frac{\lambda_{sr}}{P_s}\gamma}\left[1 - \exp\left(-\frac{\lambda_{rd}\gamma}{P_r}\right)\right]^N.$$

Using the binomial expansion, $$P_{out} = 1 + e^{-\frac{\lambda_{sr}}{P_s}\gamma} \sum_{i=1}^{N}\binom{N}{i}(-1)^i \exp\left(-\frac{i\lambda_{rd}\gamma}{P_r}\right), \quad (31)$$

where, $\gamma = 2^{2R_d} - 1$.

Figure 5:
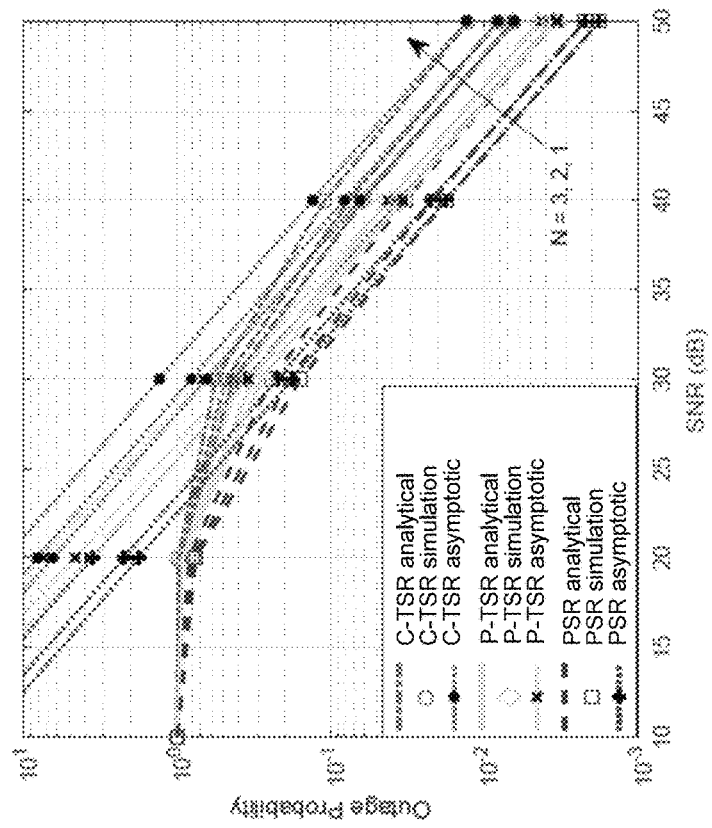
FIG. 5 is an exemplary graph of the outage probability of the system as a function of signal noise ratio (SNR) for different numbers of destinations, and for three SWIPT relaying protocols: conventional time-switching relaying (C-TSR) protocol; a time-switching relaying protocol according to certain embodiments of the present disclosure (P-TSR); and conventional power-splitting relaying (PSR) protocol.

FIG. 5 is an exemplary graph of the outage probability $P_{out}$ of the dual-hop multi-destination relaying SWIPT network systems as a function of SNR for different N values. Here, the derived analytical results ("analytical") and asymptotic results ("asymptotic") are compared with Monte-Carlo simulation results ("simulation"), for the three protocols: the P-TSR protocol according to certain embodiments of the present disclosure with the time slot of FIG. 2; the C-TSR protocol with the time slot of FIG. 3; and the PSR protocol with the time slot of FIG. 4. For all cases, followings were assumed: the source and the relay are located at (0, 0) and (1, 0), respectively; the destinations are located in close proximity around (3, 0); the path-loss exponent and energy harvesting efficiency are 4 and 0.9, respectively, and a normalized data rate $R_d=2$ b/s/Hz.

Those parameters are common for other simulation results described below, unless otherwise stated.

FIG. 5 clearly demonstrates matching between the analytical and the simulation results for each protocol. It is also clear that the P-TSR protocol according to certain embodiments of the present disclosure outperforms the C-TSR for practical SNR range larger than 20 dB. The PSR protocol further outperforms both the C-TSR and P-TSR protocols. However, the above improvements indicated by P-TSR protocol according to certain embodiments of the present disclosure still have practical importance, because at current status of the art, less complex receivers for the TSR protocol are more easily available than those for the PSR protocols in the market place. The slope of the high SNR region indicates matches with asymptotic results which predicted the unity value of the diversity order $G_d$. Further, one can see that no multi-user diversity gain can be achieved in dual-hop systems with the SWIPT technique.

Figure 6:
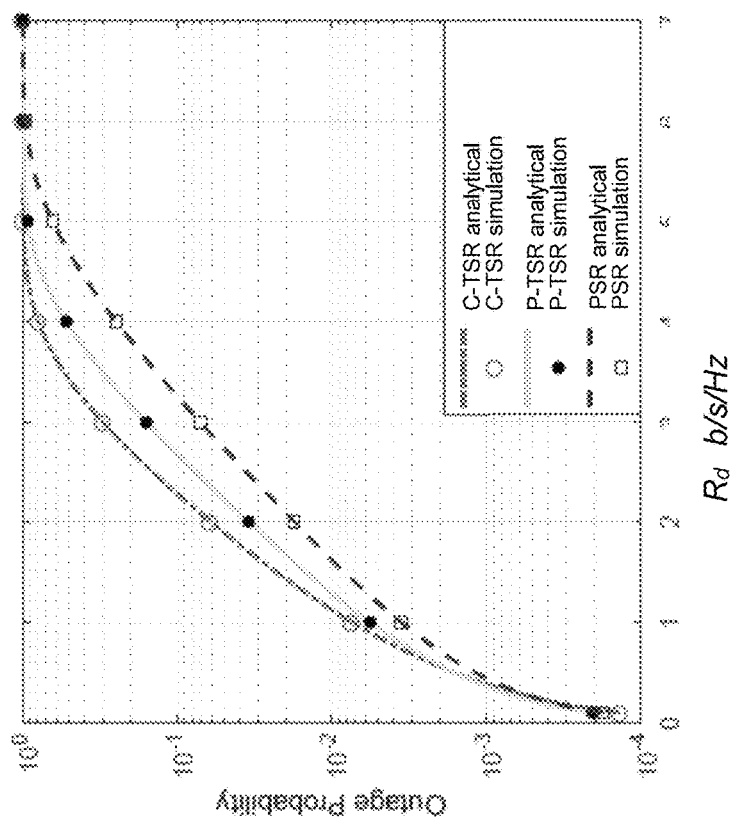
FIG. 6 is an exemplary graph of the outage probability of the system as a function of normalized signal rate $R_d$ for three SWIPT relaying protocols: conventional time-switching relaying (C-TSR) protocol; a time-switching relaying protocol (P-TSR) according to certain embodiments of the present disclosure; and conventional power-splitting relaying (PSR) protocol.

FIG. 6 is an exemplary graph of the outage probability of the dual-hop multi-destination relaying SWIPT network systems as a function of normalized signal rate $R_d$ (b/s/Hz) for the three SWIPT protocols same as those described in FIG. 5. Here, the multi-destination number N=3 and the source power $P_s=40$ dB were used. FIG. 6 also clearly demonstrates that the P-TSR protocol according to certain embodiments of the present disclosure outperforms the C-TSR protocol with the conventional time slot of FIG. 3.

Figure 7:
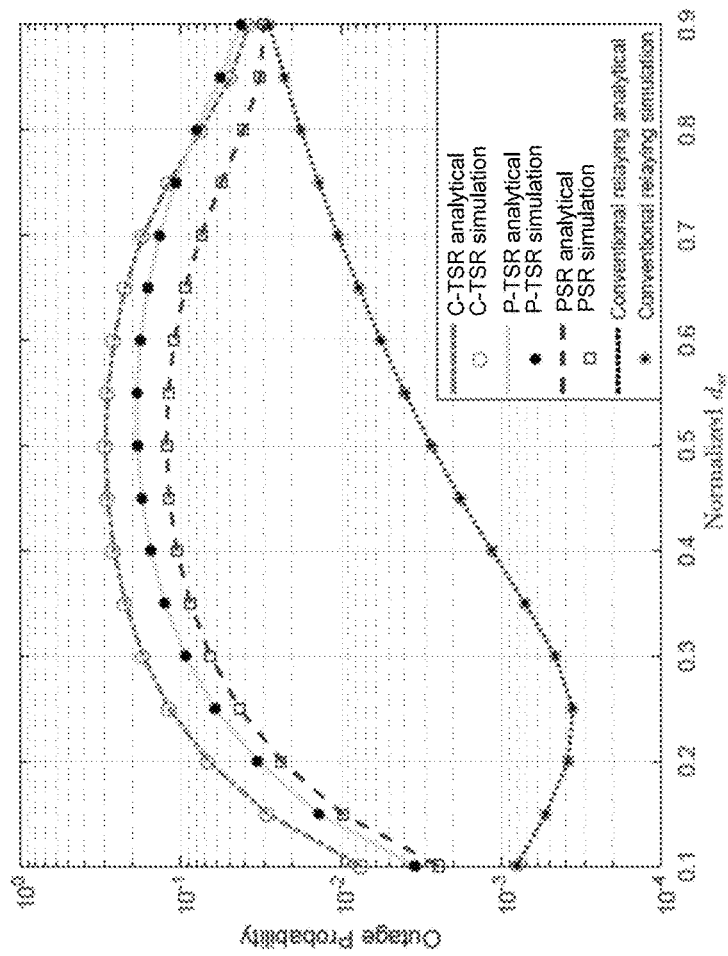
FIG. 7 is an exemplary graph of the system outage probability as a function of normalized distance between the source and the relay, for three SWIPT relaying protocols: conventional time-switching relaying (C-TSR) protocol; a time-switching relaying protocol (P-TSR) according to certain embodiments of the present disclosure; and conventional power-splitting relaying (PSR) protocol, and for conventional (non-SWIPT) relaying protocol.

FIG. 7 is an exemplary graph of the system outage probability as a function of normalized distance between the source and the relay, for the three SWIPT relaying protocols same as those in FIG. 5 and for the conventional dual-hop (non-SWIPT) relaying protocol. Here, the power of the source $P_s=50$ dB and the data rate $R_d=1.5$ b/s/Hz were assumed. The FIG. 7 indicates that the optimum location of the relay node in the conventional non-SWIPT relay networks is somewhere between the source and the destinations: at around the normalized distance $d_{sr}=0.25$ in the present case. This is not the case in SWIPT relay networks where the best performance is achieved when the relay is located close to the source. It is because when the relay is close to the source, the harvested energy will be higher, and hence less the outage probability. On the other hand, lowering of the outage probability also occurs when the relay is located close to the destination. This is because, when the relay is close to the destinations, most of the outage events occur in the first hop and the harvested energy will be low, but at the same time, the distance between the relay and the destinations is less and less power is required to forward the data from the relay to a selected destination. FIG. 7 also demonstrates that P-TSR protocol according to the certain embodiments of the present disclosure achieves lower values in the outage probability than those of the C-TSR protocol in most of the normalized distance range. This means that the P-TSR protocol can offer a larger value of the normalized distance or more flexibility in designing the distance between the source and the relay than the C-PSR protocol can, when a specification of the system defines a maximum value of the outage probability.

Figure 8:
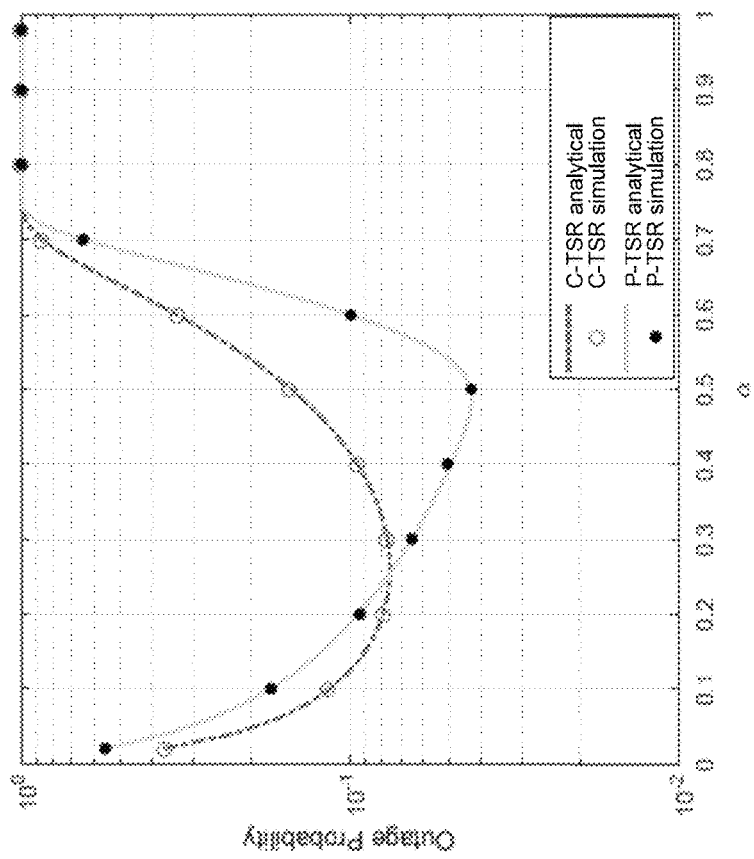
FIG. 8 is an exemplary graph of the system outage probability as a function of the time-switching ratio $\alpha$ for the conventional time-switching relaying (C-TSR) protocol and a time-switching relaying (P-TSR) protocol according to certain embodiments of the present disclosure.

FIG. 8 is an exemplary graph of the system outage probability $P_{out}$ as a function of the time-switching ratio α for the two time-switching protocols, the P-TSR protocol according to certain embodiment of the present disclosure and the C-TSR protocol. Note that the time switching ratio α for the P-TSR protocol and one for the C-TSR protocol are defined as illustrated in FIG. 2 and FIG. 3, respectively. Commonly assumed conditions are the multi-destination number N=3, the source power $P_s$=40 dB and the data rate $R_d$=2 b/s/Hz. This figure also demonstrates that the P-TSR protocol according to certain embodiments of the present disclosure achieves lower values of the outage probability than those of those of the C-TSR protocol for a wide range of 0.25≤α≤0.55 under the given conditions. Notably, the minimum points of the outage probability for P-TSR protocol and the C-TSR protocol both correspond to a same 0.25T time duration of the phase I for the energy harvesting. This may show a cause of improvements brought by the P-TSR protocol as discussed below.

that of the C-TSR protocol. This reduction is thus attributed to the large time duration of the second time slot (Slot II in Table II) 0.50T in the P-TSR protocol. In other words, the large time duration brought the SNR outage threshold $\gamma_2$ at the destination smaller than (that is superior to) either of the SNR outage threshold $\gamma_1$ of the P-TSR protocol or the SNR outage threshold $\gamma_2$ of the C-TSR protocol. Based on this information the following design guidelines may apply: i) the long time duration of the second time slot $\tau_{SLII}$=0.50T, that is, the small value of the SNR outage threshold $\gamma_2$ at the destination has a large contribution in reducing the minimum of the $P_{out}$, ii) in order to reduce the SNR outage threshold $\gamma_2$, assigning a time duration of the second time slot longer than the time duration of the phase II ($\tau_{SLII}$>$\tau_{PII}$) is effective, in spite of the deterioration of the SNR outage threshold of $\gamma_1$ at the relay.

Based on the design guidelines, an applicable length of the second time slot (Slot II) may be determined for a reduction of the outage probability. The details of P-TSR portion, see Table II, indicate that for the time duration for the phase I ($\tau_{PI}$) for the energy harvesting, a lower limit of is around 0.13 T to 0.19T with assumed criteria that the improvement is almost totally cancelled out at 0.13T and about 20% of the improvement is cancelled at 0.19T For the time duration for the phase II (r$\tau_{PII}$) for communication between the source and the relay, a lower limit is around 0.21 T to 0.23 T under the same criteria as of the phase I. These indicate that the time duration of the second time slot ($\tau_{SLII}$) can have further longer values than 0.50T up to about 0.6T ($\tau_{SLII}$≤T−(0.19+0.23)T=0.58T), when the cancellation of a certain amount (most probably about 20% to 40%) of the improvement was assumed acceptable. On the other hand, a lowest end of the time duration of the second time slot $\tau_{SLII}$ can be estimated as follows. The results on the C-TSR protocol in FIG. 8 indicate the best performance occurs when the time durations of the Phase I ($\tau_{PI}$) and the second time slot ($\tau_{SLII}$) are around 0.25T, 0.38T respectively. Further increase of the time durations of the Phase I ($\tau_{PI}$) to 0.4T, where the time duration of the time slot II ($\tau_{SLII}$) is 0.3, the outage probability rapidly increases from 0.075 to 0.095.

TABLE II

| | | Time duration | | | Outage threshold | | Outage Probability |
| --- | --- | --- | --- | --- | --- | --- | --- |
| | | Phase I | Phase II | Slot II | | | |
| | α | $\tau_{PI}$ | $\tau_{PII}$ | $\tau_{SLII}$ | $\gamma_1$ | $\gamma_2$ | $P_{out}$ |
| P-TSR | 0.58 | 0.29T | 0.21T | 0.50T | $2^{4.8R}-1$ | $2^{2R}-1$ | 0.075 (Phase II limit) |
| | 0.54 | 0.27T | 0.23T | | $2^{4.3R}-1$ | $2^{2R}-1$ | 0.052 (+20%) |
| | 0.50 | 0.25T | 0.25T | | $2^{4.0R}-1$ | $2^{2R}-1$ | 0.043 (minimum) |
| | 0.38 | 0.19T | 0.31T | | $2^{3.2R}-1$ | $2^{2R}-1$ | 0.052 (+20%) |
| | 0.26 | 0.13T | 0.37T | | $2^{2.7R}-1$ | $2^{2R}-1$ | 0.075 (Phase I limit) |
| C-TSR | 0.25 | 0.25T | 0.34T | 0.38T | $2^{2.6R}-1$ | $2^{2.6R}-1$ | 0.075 (minimum) |

Table II summarizes the time durations for the phases I and II of the first time slot and for the second time slot (Slot II), and the SNR outage thresholds $\gamma_1$ and $\gamma_2$ together with the minimum values of the outage probability $P_{out}$ for the P-TSR protocol and the C-TSR protocol.

When the minimum points of $P_{out}$ (hatched lines of the Table II) is compared, the P-TSR protocol has an SNR outage threshold $\gamma_1$ at the relay larger than (inferior to) that of the C-TSR protocol due to a shorter time duration of the phase II 0.25T than that of the C-TSR protocol 0.38T, assuming a same data rate $R_d$. In spite of this disadvantage, the P-TSR protocol exhibits a reduction in the minimum value of the outage probability $P_{out}$ down to almost a half of This fact indicates that reducing the second time slot less than about $\tau_{SLII}$=0.4 would bring no improvement from the C-TSR, and the lower end of the time duration of the second time slot would be about 0.4T. Thus, based on the design guidelines and the criteria above described, an applicable range of the time duration of the second time slot $\tau_{SLII}$ is derived as not smaller than about 0.4T and not greater than about 0.6T, the time duration for the phase I $\tau_{PI}$ is not smaller than about 0.13T, preferably not smaller than about 0.19T, the time duration for the phase II $\tau_{PII}$ is not smaller than about 0.21T, preferably not smaller than 0.23T.

Importantly, the design guidelines and the limits of the time durations described above show that further improvements in reducing the outage probability may be obtained by adjusting the time durations of the second time slot in accordance with the above guidelines, not only in the P-TSR protocol but also in the PSR protocol. In the P-TSR protocol, the time switching ratio α would naturally interplay (see FIGS. 9-13 below).

Figure 9:
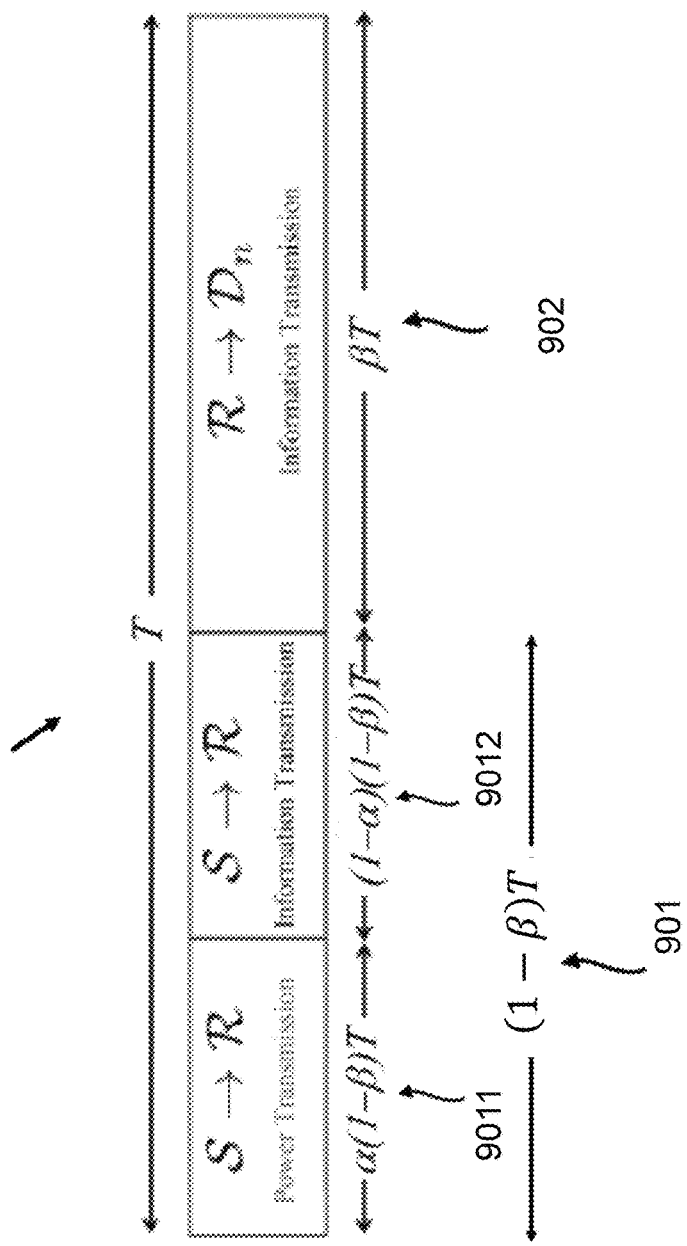
FIG. 9 is a schematic diagram of a generalized time slot of time-switching relaying (GP-TSR) protocol for the SWIPT relaying network in a format with a time-switching ratio $\alpha$ and a second time slot ratio A according to certain embodiments of the present disclosure.

FIG. 9 is an exemplary diagram of a generalized time slot T 900 according to certain embodiments of the present disclosure for the time-switching relaying ("GP-TSR") protocol for the dual-hop SWIPT relay network. Here the first time slot 901 is assigned for the source for a time duration of $(1-\beta)T$ and the second time slot 902 is assigned for the relay for the length of $\beta T$. In phase I 9011 of the first time slot 901, the relay R harvests energy from the RF signal from the source S for a time duration of $\alpha(1-\beta)T$. In phase II 9012 of the first time slot 901, the source S communicates with the relay R over a time duration of $(1-\alpha)(1-\beta)T$. In the second time slot 902, the relay R communicates with a selected destination $D_i$ over a time duration of $\beta T$. Referring the equations (1)-(5) and related analysis, we obtain following relations for the harvested energy at the relay $E_r^{GPTSR}$, the SNR outage threshold of the phase I $\gamma_1^{GPTSR}$, the transmission power of the relay $p_r^{GPTSR}$, the SNR outage threshold at the selected destination $\gamma_2^{GPTSR}$ for the GP-TSR.

$$E_r^{GPTSR} = \zeta\alpha(1-\beta)P_s\varphi_{sr}T, \tag{32}$$

$$R_d \leq (1-\alpha)(1-\beta)\log_2(1+P_s\varphi_{sr}), \text{ or}$$

$$P_s\varphi_{sr} \geq 2^{\frac{R_d}{(1-\alpha)(1-\beta)}} - 1 = \gamma_1^{GPTSR}, \tag{33}$$

$$P_r^{GPTSR} = \frac{E_r^{GPTSR}}{\beta T} = \frac{\zeta\alpha(1-\beta)P_s\varphi_{sr}}{\beta}, \tag{34}$$

$$R_d \leq \beta\log_2(1+P_r^{GPTSR}\varphi_{rd}^*), \text{ or}$$

$$P_r^{GPTSR}\varphi_{rd}^* \geq 2^{\frac{R_d}{\beta}} - 1 = \gamma_2^{GPTSR}, \tag{35}$$

Based on those relations, and by the same manipulations as in the derivation of the equation (24), we obtain the outage probability for GP-TSR as the fourth ramification d) of the unified expression (16) for the outage probability as d) for GP-TSR protocol, $$\psi = \frac{\zeta\alpha(1-\beta)}{\beta}\left(\equiv \frac{P_r}{P_s\varphi_{sr}}\right), \gamma_1 = 2^{\frac{R_d}{(1-\alpha)(1-\beta)}} - 1, \tag{36}$$

$$\gamma_2 = 2^{\frac{R_d}{\beta}} - 1, \delta_1 = 0, \text{ and } \delta_2 = 1.$$

Figure 10:
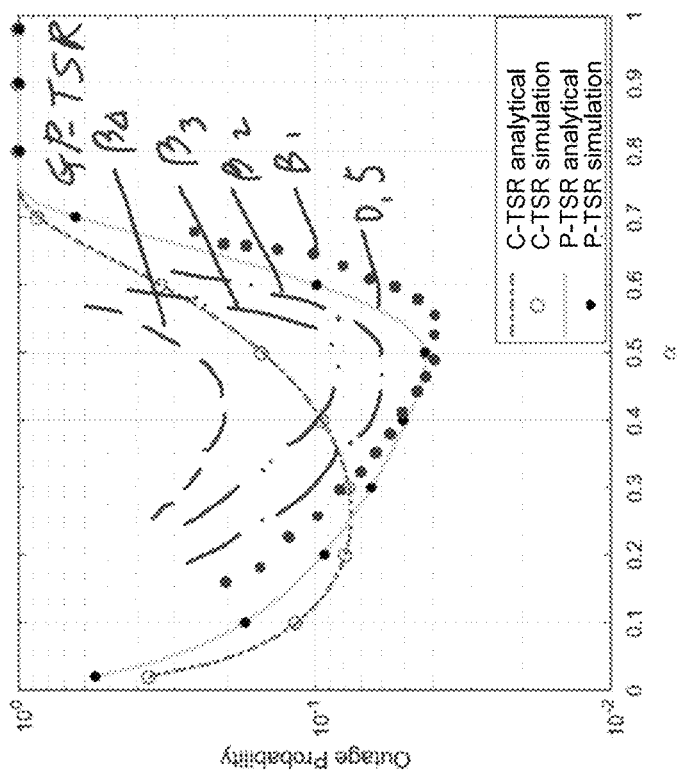
FIG. 10 is an exemplary graph of the system outage probability as a function of the time-switching ratio $\alpha$, with the second time slot ratio $\beta$ as a parameter, for a generalized time-switching protocol according the certain embodiments of the present disclosure (GP-TSR) compared with the C-TSR protocol.

FIG. 10 is an exemplary graph of the system outage probability as a function of the time-switching ratio α for the generalized time-switching protocol according the certain embodiments of the present disclosure (GP-TSR), compared with the C-TSR protocol. For the GP-TSR, the first time slot ratio β are taken as a parameter. Here, the minimum point of the $P_{out}$ varies depending on the value of the first time slot ratio β.

Figure 11:
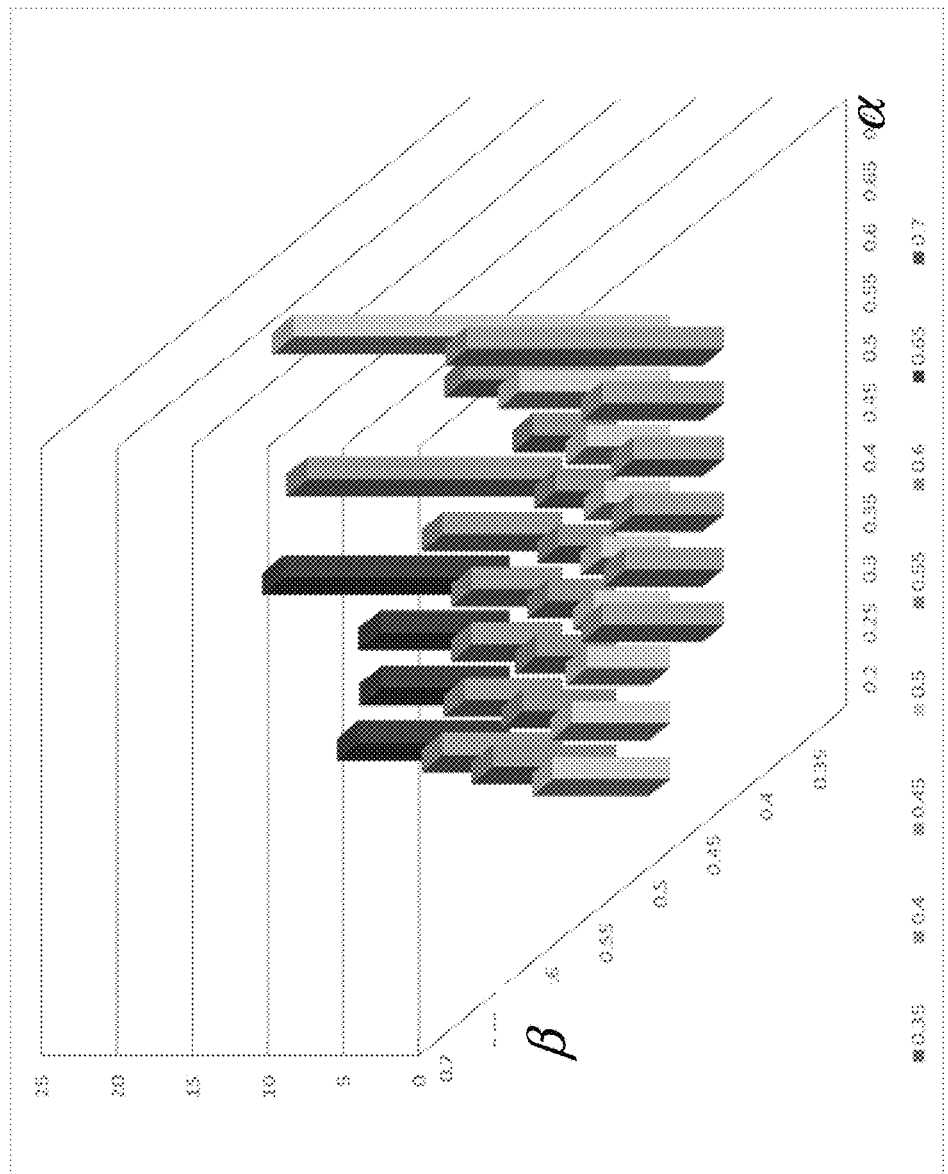
FIG. 11 is an exemplary graph of the system outage probability as a function of the time-switching ratio $\alpha$ and the second time slot ratio $\beta$ extracted from the calculation results of FIG. 10.

FIG. 11 is an exemplary graph of the system outage probability as a function of the time-switching ratio α and the second time slot ratio β depicted from the calculation results of FIG. 10. From this figure one can determine ranges of α and β as an area in the two-dimensional surface of α and β axes that gives the minimum of the outage probability under the given conditions.

Figure 12:
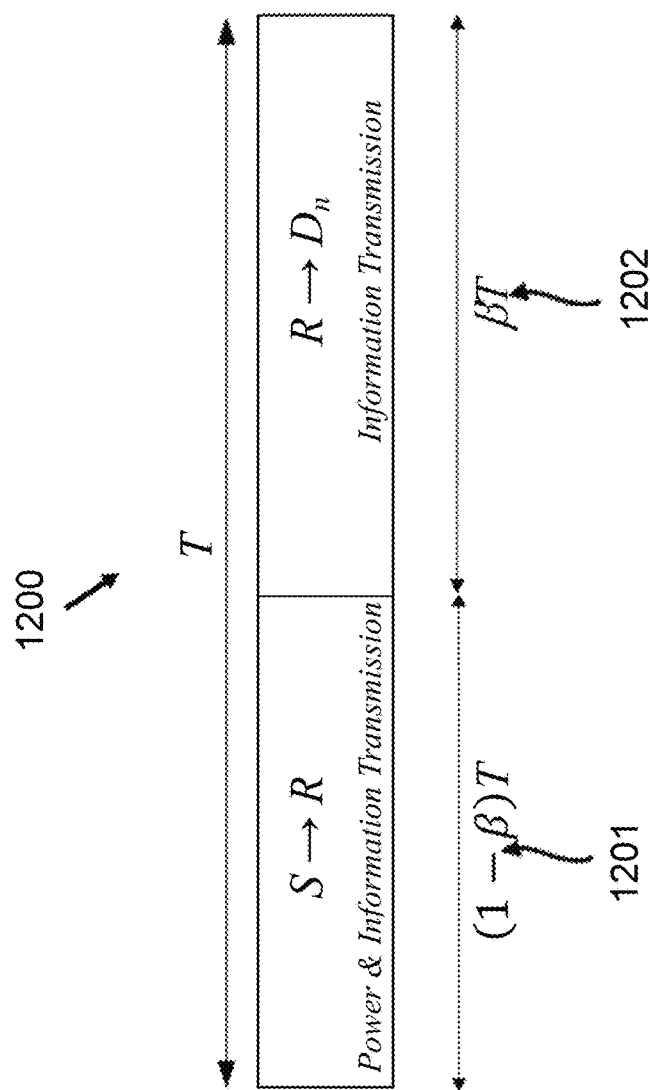
FIG. 12 is an exemplary diagram of a time slot of a generalized power splitting relaying protocol ("G-PSR") according to certain embodiments of the present disclosure for the SWIPT relay network.

FIG. 12 is an exemplary diagram of a time slot T 1200 of a generalized power splitting relaying protocol ("G-PSR") according to certain embodiments of the present disclosure for the dual-hop SWIPT relay network. Here the first time slot 1201 is assigned for the source for a time duration of $(1-\beta)T$ and the second time slot 1202 is assigned for the relay for the length of $\beta T$. In the first time slot 1201, the source S communicates with the relay R over a time duration of $(1-\beta)T$. A portion $\rho \in [0, 1]$ of the received power is fed to the information decoder of the relay R. Based on similar arguments made in the PSR protocol, following relation are derived.

$$R_d \leq (1-\beta)\log_2(1+\rho P_s\varphi_{sr}), \text{ or} \tag{37}$$

$$\rho P_s\varphi_{sr} \geq 2^{\frac{R_d}{(1-\beta)}} - 1 = \gamma_1^{GPSR},$$

where $\gamma_1^{GPSR}$ is the SNR outage threshold at the relay of the G-PSR protocol. The maximum harvested energy $E_r^{GPSR}$ is given by $$E_r^{GPSR} = \zeta(1-\beta)T[P_s\varphi_{sr} - \rho P_s\varphi_{sr}]^+ = \zeta(1-\beta)T(P_s\varphi_{sr} - \gamma_1^{GPSR}). \tag{40}$$

The transmission power of the relay is given by $$P_r^{GPSR} = \frac{E_r^{GPSR}}{\beta T} = \zeta\frac{(1-\beta)}{\beta}(P_s\varphi_{sr} - \gamma_1^{GPSR}). \tag{41}$$

Since SNR at the selected destination is given by $P_r^{GPSR}\varphi_{rd}^*$, the destination can successfully decode the relay message with a targeted data rate $R_d$ if $$R_d \leq \beta\log_2(1+P_r^{GPSR}\varphi_{rd}^*), \text{ or } P_r^{GPSR}\varphi_{rd}^* \geq 2^{\frac{R_d}{\beta}} - 1 = \gamma_2^{GPSR}, \tag{42}$$

where $\gamma_2^{GPSR}$ the SNR outage threshold at the selected destination. Based on those relations, and by the same manipulations as in the derivation of the equation (26) for the PSR protocol, we obtain the outage probability for G-PSR as the fifth ramification e) of the unified expression (16) for the outage probability as e) for G-PSR protocol, $$\psi = \frac{\zeta(1-\beta)}{\beta}\left(\equiv \frac{P_r}{(P_s\varphi_{sr} - \gamma_1)}\right),$$

$$\gamma_1 = 2^{\frac{R_d}{(1-\beta)}} - 1, \gamma_2 = 2^{\frac{R_d}{\beta}} - 1, \delta_1 = 1, \text{ and } \delta_2 = 0.$$

Figure 13:
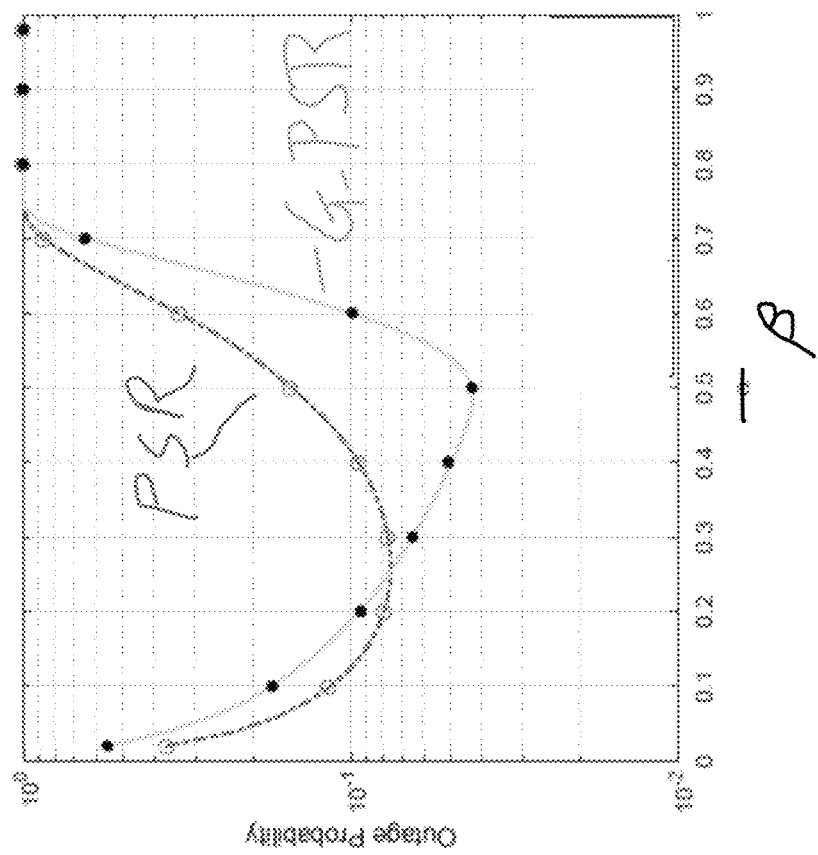
FIG. 13 is an exemplary graph of the system outage probability as a function of the second time slot ratio $\beta$ for the G-PSR protocol according the certain embodiments of the present disclosure, compared with the PSR protocol.

FIG. 13 is an exemplary graph of the system outage probability as a function of the time-switching ratio α for the G-PSR protocol according the certain embodiments of the present disclosure, compared with the PSR protocol. For the G-PSR protocol, the first time slot ratio β are taken as a parameter. Here, the minimum point of the $P_{out}$ varies depending on the value of the first time slot ratio β, and improvement is realized by adjusting the time slot ratio. (Note to inventors:)

Figure 14:
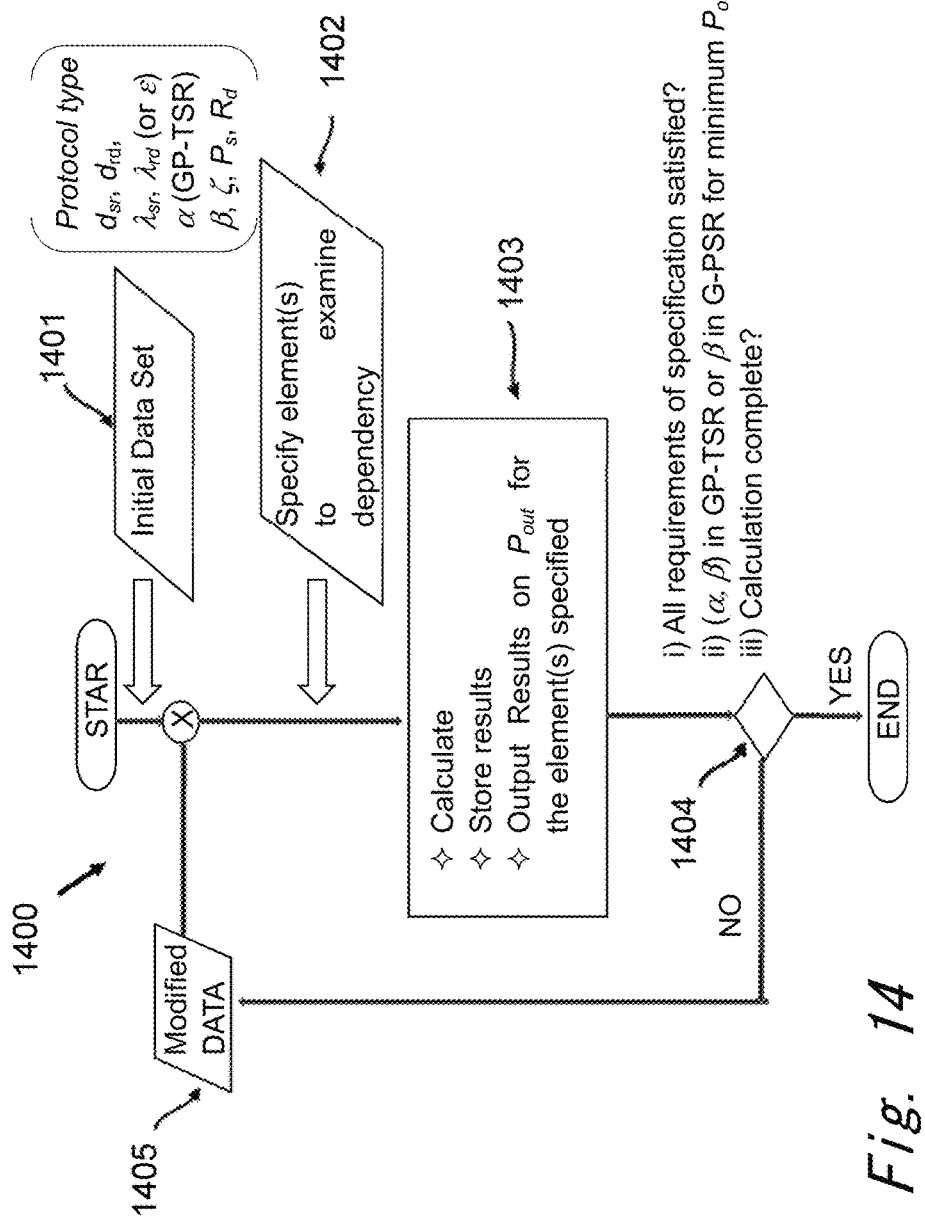
FIG. 14 is an exemplary flowchart illustrating design procedure for both the G-TSR protocol and the G-PSR protocol for the SWIPT relaying network according to certain embodiments of the present disclosure.

FIG. 14 is an exemplary flowchart illustrating design procedure for both the G-TSR protocol and the G-PSR protocol for the SWIPT relaying network according to certain embodiments of the present disclosure. As the first step, an initial data set is prepared based on given system specifications. The initial data set includes a choice of the protocol from the G-TSR or the G-PSR, the distance between the source and the relay $d_{sr}$ and one between the relay and the destination $d_{rd}$, the parameter $\lambda_{sr}$, $\lambda_{rd}$ for the exponential distribution of the channel power or ε which defines the parameters as $\lambda_{ab}=d_{ab}^{\varepsilon}$ with $a\in\{s,r\}$ and $b\in\{r,d\}$, the time switching ratio α (for the G-TSR only) and the second time slot ratio β as defined in FIGS. 9 and 12, the energy harvesting efficiency ζ, the source power $P_s$, the data rate $R_d$, and other required specifications of the system including the minimum SNR and the maximum source power and the minimum data rate, the maximum outage probability, an allowable relay node distance range. The second step specifies an element (or two if any as a parameter) to examine dependency of the outage probability $P_{out}$. The third step calculates the outage probability $P_{out}$ using the unified expression (16) under the selected protocol and related equations, store and outputs results as diagrams illustrating $P_{out}$ as a function of the specified element (with the parameter if any specified.) The diagrams may include $P_{out}$ vs. the SNR diagram, $P_{out}$ vs. the normalized $d_{sr}$ diagram, $P_{out}$ vs. the data rate $R_d$ diagram, $P_{out}$ vs. the time switching ratio α with the second time slot ratio β as a parameter, $P_{out}$ vs. the second time slot ratio β, or the three dimensional $P_{out}$ mapping on the two dimensional (α,β) plane for the G-TSR protocol. The fourth step requests a decision on whether i) the calculation results with the data set satisfies all the required specifications, ii) the values of (α,β) giving minimum $P_{out}$ have been obtained and iii) calculation has completed. Depending on the answer, the flow ends or moves to the fifth step where a modified data set is prepared. Then the flow returns to the joining point X and then moves to the second step, a new calculation starts.

A protocol and a relayed wireless network which include the features in the foregoing description provide numerous improvements. The P-TSR protocol or GP-TSR protocol for the SWIPT relaying network, and the SWIPT relaying network operated with those protocols described in the present disclosure realize a better performance than other TSR protocols or the SWIPT relaying network operated with other TSR protocols. Similarly the G-PSR protocol also realizes a further improvement from other PSR protocol.

Thus, the present disclosure provides an improvement to the technical field of wireless communications. For example, it improves the performance of wireless network in outage probability, therefore improves capacity, tolerance and a design flexibility of a wireless network. In addition, the present disclosure regarding improvement of TSR protocol has the benefit in cost and availability of devices over PSR protocol at current industry status.

In addition, when a performance improvement is the first-priority in designing a system, G-PSR protocol can offer an advanced approach with a further improvement in the outage probability. Thus, the present disclosure improves the functioning of the SWIPT relaying network by increasing data rate, capacity and tolerance, decreasing outage probability and power consumption.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A simultaneous wireless information and power transfer (SWIPT) relaying network system, the SWIPT relaying network system comprising:
    a source configured to transmit a wireless signal comprising a radio frequency electromagnetic wave;
    a relay configured to receive the wireless signal, harvest energy from the wireless signal, and to decode the wireless signal, regenerate and transmit a relayed wireless signal; and
    a destination node located out of a transmission range of the source and capable of receiving the relayed wireless signal from the relay,
    wherein a relaying protocol incorporated in and configured to regulate transmissions in the SWIPT relaying network system, an overall time slot constituting the relaying protocol comprising:
    a first time slot assigned for a transmission of the wireless signal from the source to the relay, wherein at least part of the first time slot being assigned for an information transmission from the source to the relay; and
    a second time slot following the first time slot and assigned for a transmission of the relayed wireless signal from the relay to the destination node,
    wherein, a time duration of the second time slot is configured to be greater than a time duration of the at least part of the first time slot assigned for the information transmission from the source to the relay.

2. The SWIPT relaying network system of claim 1, wherein the first time slot further comprising:
    a phase I assigned for harvesting the energy from the wireless signal at the relay; and
    a phase II following the phase I and assigned for the information transmission from the source to the relay.

3. The SWIPT relaying network system of claim 2, wherein the time duration of the phase I normalized by the time duration of the overall time slot is configured to be not less than about 0.13, the time duration of the phase II normalized by the time duration of the overall time slot is configured to be not less than about 0.21, and the time duration of the second time slot normalized by a time duration of the overall time slot is configured to be not less than about 0.4.

4. The SWIPT relaying network system of claim 3, wherein the time duration of the phase I normalized by the time duration of the overall time slot is configured to be not less than about 0.19, the time duration of the phase II normalized by the time duration of the overall time slot is configured to be not less than about 0.23, and the time duration of the second time slot normalized by the time duration of the overall time slot is configured to be about 0.5.

5. The SWIPT relaying network system of claim 4, wherein the time duration of the phase II normalized by the time duration of the overall time slot is configured to be about 0.25.

6. The SWIPT relaying network system of claim 1, wherein the destination node is one of a plurality of destination nodes selected by detecting a best channel from the plurality of the destination nodes.

7. The SWIPT relaying network system of claim 1, wherein the relay is further configured to harvest the energy from the wireless signal and to receive an information from the wireless signal from the source during the first time slot concurrently.

8. The SWIPT relaying network system of claim 7, wherein the time duration of the second time slot normalized by a time duration of the overall time slot is configured to be not larger than 0.20.

9. A communication method for a simultaneous wireless information and power transfer (SWIPT) relaying network system, the communication method comprising:
  transmitting a wireless signal comprising a radio frequency electromagnetic wave by a source node;
  receiving the wireless signal by a relay node;
  harvesting energy from the wireless signal by the relay node;
  decoding the wireless signal, and regenerating and transmitting a relayed wireless signal by the relay node; and
  receiving the relayed wireless signal from the relay by a destination node, the destination node located out of a transmission range of the source and capable of receiving the relayed wireless signal from the relay,
  wherein a relaying protocol incorporated in and configured to regulate transmissions in the SWIPT relaying network system, an overall time slot constituting the relaying protocol further comprising:
  a first time slot assigned for a transmission of the wireless signal from the source to the relay, wherein at least part of the first time slot is assigned for an information transmission from the source to the relay; and
  a second time slot following the first time slot and assigned for a transmission of the relayed wireless signal from the relay to the destination node,
  wherein, a time duration of the second time slot is configured to be greater than a time duration of the at least part of the first time slot assigned for the information transmission from the source to the relay.

10. The communication method of claim 9, wherein the first time slot further comprising:
  a phase I assigned for harvesting the energy from the wireless signal by the relay; and
  a phase II following the phase I and assigned for the information transmission from the source to the relay.

11. The communication method of claim 10, wherein a time duration of the phase I normalized by a time duration of the overall time slot is configured to be not less than about 0.13, a time duration of the phase II normalized by the time duration of the overall time slot is configured to be not less than about 0.21, and the time duration of the second time slot normalized by the time duration of the overall time slot is configured to be not less than about 0.4.

12. The communication method of claim 11, wherein the time duration of the phase I normalized by the time duration of the overall time slot is configured to be not less than about 0.19, the time duration of the phase II normalized by the time duration of the overall time slot is configured to be not less than about 0.23, and the time duration of the second time slot normalized by the time duration of the overall time slot is configured to be about 0.5.

13. The communication method of claim 12, wherein the time duration of the phase II normalized by the time duration of the overall time slot is configured to be about 0.25.

14. The communication method of claim 9, wherein the communication method further comprising:
  determining a structure of the overall time slot, the structure comprising ratios of time durations of subparts of the overall time slot against a time duration of the overall time slot, wherein the determining the structure of the overall time slot further comprising:
  preparing an initial data set;
  specifying an element from the initial data set;
  calculating an outage probability for the source to the destination communication as function of the element specified, storing and outputting calculated results;
  deciding whether a condition giving a minimum value of the outage probability has been found and whether an additional calculation is required by comparing the calculated results with predetermined specifications; and
  modifying the initial data for starting over if additional calculation is required, wherein, the initial data set comprising:
  a choice of a type of the relaying protocol configured to control the communication method for SWIPT relaying, either of a generalized time slot of time-switching relaying GP-TSR protocol or a generalized power splitting relaying G-PSR protocol;
  a distance between the source and the relay $d_{sr}$ and a distance between the relay and the destination $d_{rd}$, wherein subscripts s, r and d denoting the source, the relay and the destination, respectively;
  parameters $\lambda_{sr}$ and $\lambda_{rd}$ for exponential distributions of channel power, or instead an exponent s defining the parameters by $\lambda_{ab} = d_{ab}^{\varepsilon}$, wherein $d_{ab}$ denoting a distance between a and b with $a \in \{s,r\}$ and $b \in \{r,d\}$;
  a time switching ratio $\alpha$ defined by a ratio of a time duration for the relay to harvest the energy from the wireless signal against a time duration of the first time slot if the GP-TSR is selected;
  a second time slot ratio $\beta$ defined by a ratio of the time duration of the second time slot against the time duration of the overall time slot constituting the SWIPT;
  an energy harvesting efficiency $\zeta$;
  a source power $P_s$; and
  a data rate $R_d$,
and wherein further, the outage probability $P_{out}$ is calculated using a unified expression for the outage probability given by $$P_{out} = 1 + e^{-\delta_1 \frac{\lambda_{sr}\gamma_1}{P_s}} \sum_{i=1}^{N} \binom{N}{i}$$

$$(-1)^i \left[ \sqrt{\beta_i \gamma_2} K_1(\sqrt{\beta_i \gamma_2}) + \delta_2 \sum_{j=0}^{\infty} \frac{(-\lambda_{sr}\gamma_1)^{j+1} E_{j+2}\left(\frac{i\lambda_{rd}\gamma_2}{\psi\gamma_1}\right)}{j! P_s^{j+1}} \right],$$

wherein, $$\beta_i = \frac{4i\lambda_{rd}\lambda_{sr}}{\psi P_s}, \quad E_n(x) = \int_1^{\infty} \tau^{-n} \exp(-x\tau) d\tau, \quad K_1(\cdot)$$

is the modified Bessel function of the second kind and order one, and i) for the G-TSR protocol, $$\psi = \frac{\zeta\alpha(1-\beta)}{\beta}, \gamma_1 = 2^{\frac{R_d}{(1-\alpha)(1-\beta)}} - 1, \gamma_2 = 2^{\frac{R_d}{\beta}} - 1,$$

$\delta_1=0$, and $\delta_2=1$, ii) for the G-PSR protocol, $$\psi = \frac{\zeta(1-\beta)}{\beta}, \gamma_1 = 2^{\frac{R_d}{(1-\beta)}} - 1, \gamma_2 = 2^{\frac{R_d}{\beta}} - 1,$$

$\delta_1=1$, and $\delta_2=0$.

15. The communication method of claim 14, wherein the outage probability as function of the element specified includes:
- a dependence of the outage probability on the time switching ratio $\alpha$, with the second time slot ratio $\beta$ as a parameter, if the GP-TSR is chosen, or
- a dependence of the outage probability on the second time slot ratio $\beta$, if the G-PSR is chosen.

* * * * *